United States Patent
Goss et al.

(10) Patent No.: US 8,402,205 B2
(45) Date of Patent: Mar. 19, 2013

(54) MULTI-TIERED METADATA SCHEME FOR A DATA STORAGE ARRAY

(75) Inventors: Ryan James Goss, Lakeville, MN (US); Kevin Arthur Gomez, Eden Prairie, MN (US); Mark Allen Gaertner, Vadnais Heights, MN (US); Bruce Douglas Buch, Westborough, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 498 days.

(21) Appl. No.: 12/726,486

(22) Filed: Mar. 18, 2010

(65) Prior Publication Data

US 2011/0231596 A1 Sep. 22, 2011

(51) Int. Cl.
G06F 12/00 (2006.01)
G06F 12/02 (2006.01)
G06F 12/10 (2006.01)

(52) U.S. Cl. . 711/103; 711/156; 711/209; 711/E12.001; 711/E12.008; 711/E12.058

(58) Field of Classification Search .................. 711/156, 711/103, 209, E12.001, E12.008, E12.058
See application file for complete search history.

(56) References Cited

U.S. PATENT DOCUMENTS

| | | | |
|---|---|---|---|
| 5,897,661 | A | 4/1999 | Baranovsky et al. |
| 6,681,306 | B1 | 1/2004 | Kessler et al. |
| 6,732,124 | B1 | 5/2004 | Koseki et al. |
| 7,089,583 | B2 | 8/2006 | Mehra et al. |
| 7,383,294 | B1 | 6/2008 | Tamer et al. |
| 7,401,093 | B1 | 7/2008 | Hamilton et al. |
| 7,412,433 | B2 | 8/2008 | Anglin et al. |
| 7,428,604 | B2 | 9/2008 | Black |
| 2002/0196744 | A1 | 12/2002 | O'Connor |
| 2007/0094445 | A1 | 4/2007 | Trika et al. |
| 2007/0266384 | A1 | 11/2007 | Labrou et al. |

Primary Examiner — Yong Choe
(74) Attorney, Agent, or Firm — Hall Estill Attorneys at Law

(57) ABSTRACT

Method and apparatus for managing metadata associated with a data storage array. In accordance with various embodiments, a group of user data blocks are stored to memory cells at a selected physical address of the array. A multi-tiered metadata scheme is used to generate metadata which describes the selected physical address of the user data blocks. The multi-tiered metadata scheme provides an upper tier metadata format adapted for groups of N user data blocks, and a lower tier metadata format adapted for groups of M user data blocks where M is less than N. The generated metadata is formatted in accordance with a selected one of the upper or lower tier metadata formats in relation to a total number of the user data blocks in the group.

20 Claims, 13 Drawing Sheets

METADATA LAYOUT

| | |
|---|---|
| UPPER TIER GROUP 0 | LBA 0 TO LBA 8*(1024*30)-1 |
| UPPER TIER GROUP 1 | LBA 8*(1024*30) TO LBA 16*(1024*30)-1 |
| UPPER TIER GROUP 2 | LBA 16*(1024*30) TO LBA 24*(1024*30)-1 |
| UPPER TIER GROUP 3 | LBA 24*(1024*30) TO LBA 32*(1024*30)-1 |
| UPPER TIER GROUP 4 | LBA 32*(1024*30) TO LBA 40*(1024*30)-1 |
| ... | ... |
| UPPER TIER GROUP 63 | LBA 504*(1024*30)-1 TO LBA 512*(1024*30)-1 |

| | |
|---|---|
| LOWER TIER GROUP 0.0 | LBA 0 TO LBA (1024*30)-1 |
| LOWER TIER GROUP 0.1 | LBA (1024*30) TO LBA 2*(1024*30)-1 |
| LOWER TIER GROUP 0.2 | LBA 2*(1024*30) TO LBA 3*(1024*30)-1 |
| LOWER TIER GROUP 0.3 | LBA 3*(1024*30) TO LBA 4*(1024*30)-1 |
| LOWER TIER GROUP 0.4 | LBA 4*(1024*30) TO LBA 5*(1024*30)-1 |
| LOWER TIER GROUP 0.5 | LBA 5*(1024*30) TO LBA 6*(1024*30)-1 |
| LOWER TIER GROUP 0.6 | LBA 6*(1024*30)-1 TO LBA 7*(1024*30)-1 |
| LOWER TIER GROUP 0.7 | LBA 7*(1024*30)-1 TO LBA 8*(1024*30)-1 |

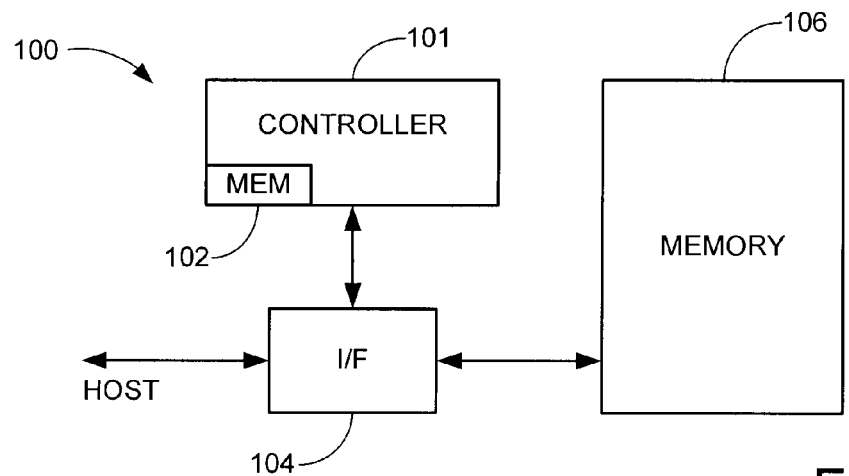
FIG. 1
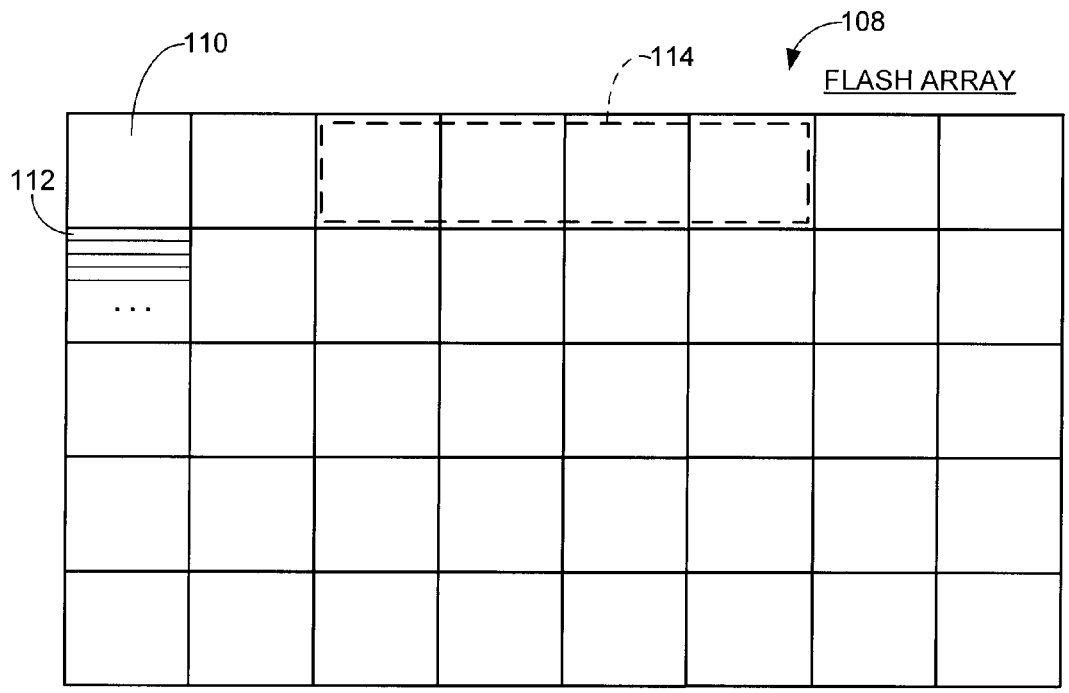
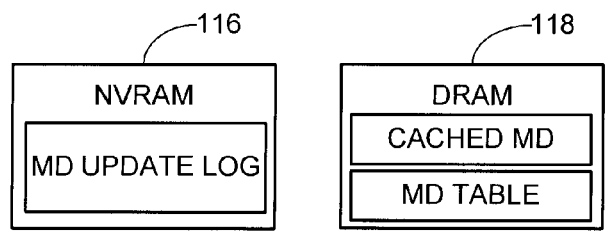
FIG. 2

METADATA LOGGING UPDATES
1) INITIAL STATE
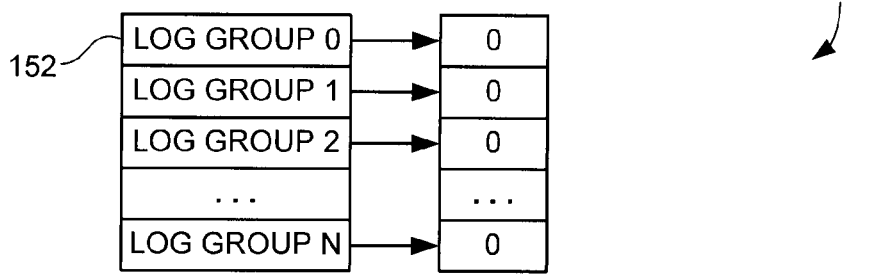
2) WRITE LBA 0X1, LEN=3 TO PAGE X
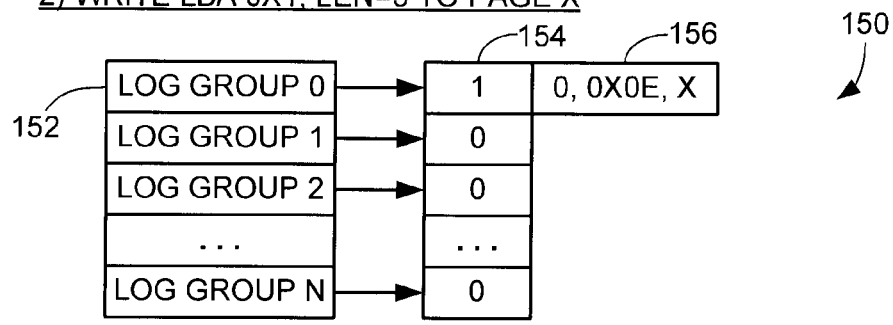
3) WRITE LBA 0X40000, LEN=8 TO PAGE W
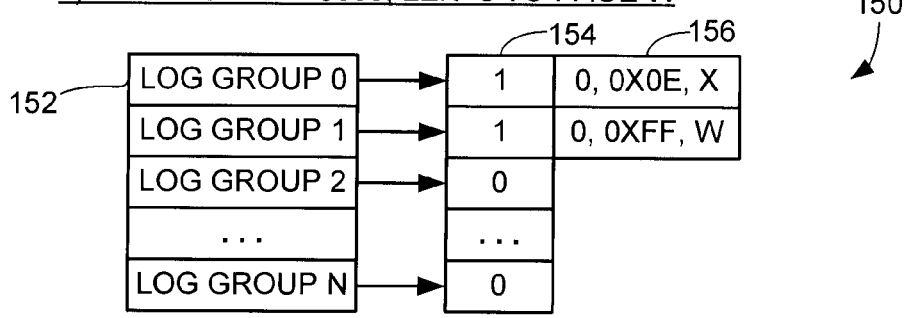
4) WRITE LBA 0XA, LEN=8 TO PAGE Y
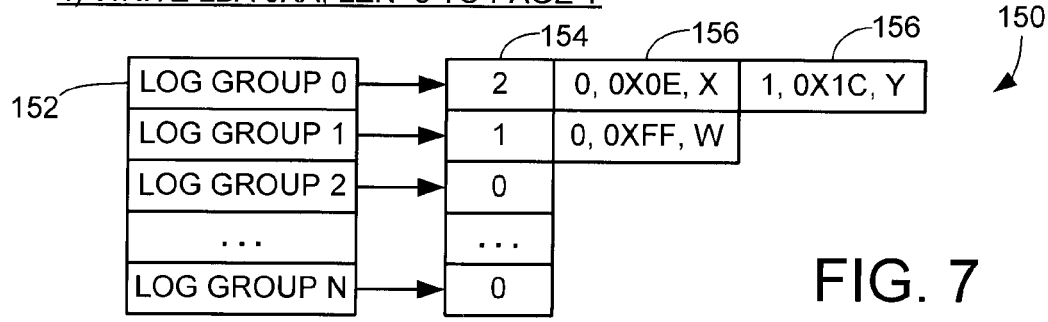
FIG. 7

US 8,402,205 B2

MULTI-TIERED METADATA SCHEME FOR A DATA STORAGE ARRAY

SUMMARY

Various embodiments of the present invention are generally directed to a method and apparatus for managing metadata in a data storage array such as a main memory space of a solid state drive (SSD).

In accordance with various embodiments, a group of user data blocks are stored to a selected physical address of a data storage array. A multi-tiered metadata scheme is used to generate metadata which describes the selected physical address of the user data blocks. The multi-tiered metadata scheme provides an upper tier metadata format adapted for groups of N user data blocks, and a lower tier metadata format adapted for groups of M user data blocks where M is less than N. The generated metadata is formatted in accordance with a selected one of the upper or lower tier metadata formats in relation to a total number of the user data blocks in the group.

These and other features and aspects which characterize the various embodiments of the present invention can be understood in view of the following detailed discussion and the accompanying drawings.

BRIEF DESCRIPTION OF THE DRAWINGS

FIG. 1 is a block diagram for a data storage device.

FIG. 2 illustrates a memory structure of the device of FIG. 1.

FIG. 7 sets forth a sequence of metadata logging updates.

DETAILED DESCRIPTION

Figure 3:
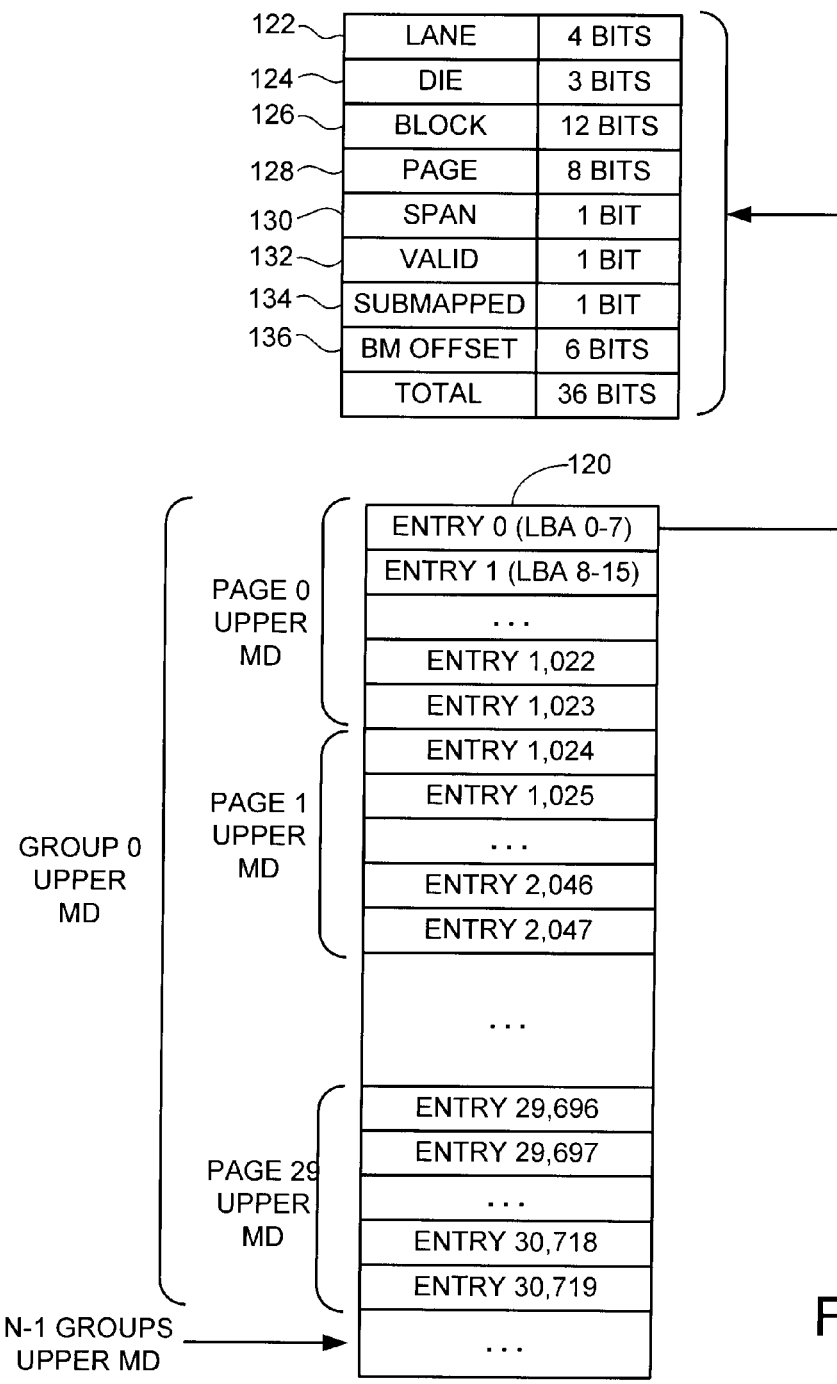
FIG. 3 is an exemplary format for upper tier metadata.

The present disclosure generally relates to data handling systems, and in particular to methods and devices that may be used to manage metadata.

Data storage devices generally operate to store blocks of data in memory. The devices can employ data management systems to track the physical locations of the blocks so that the blocks can be subsequently retrieved responsive to a read request for the stored data. Some types of data storage devices, such as solid state drives (SSDs), can be arranged to write data to a new available location each time a block is presented for writing. Over time, a situation may arise where several versions of a given block may persist in memory, with one of the versions being the most current data and the remaining versions being older, stale data.

Metadata can be generated and maintained to track the locations and status of the stored data. Such metadata tracks the relationship between logical elements (such as logical block addresses, LBAs) stored in the memory space and physical locations (such as physical block addresses, PBAs) of the memory space. However, such configurations and operations are merely illustrative of certain aspects and are not required for the various embodiments of the present invention.

A tradeoff may exist between metadata size and the flexibility of the metadata mapping system. For example, an SSD with 1 TiB ($2^{40}$ bytes) of memory may require upwards of 100 GiB ($100 \times 2^{30}$ bytes) or more of metadata to describe and track every LBA block of user data stored in the memory space. This can represent an unacceptable amount of overhead, as a large percentage of the memory space may be dedicated to the storage of the metadata rather than being available for the storage of user data. A separate, large non-volatile memory (such as an NVRAM) can be alternatively utilized for the storage of the metadata, but the requirement for a large capacity NVRAM can add significant cost to a given design.

Reductions in size of the required metadata can be made by describing groups of blocks, such as sets of N LBAs, in the metadata rather than describing the LBAs individually. This can be useful in page organized memories that allow a page worth of data, such as 4KiB (8×512 byte LBAs) to be written or read concurrently. Thus, by organizing the metadata to describe N LBAs in each page, the total amount of metadata can be reduced by a multiplying factor of about 1/N.

While operable in reducing overall size requirements, providing metadata for groups of LBAs can significantly increase the incidence of write amplification (increased numbers of overall writes) with random I/O workloads in which write data are provided in non-modulo N or non-aligned groupings. Updates to existing data may also require the use of read-modify-write operations; for example, if LBAs 0-7 have been stored and a new version of LBA 2 is provided by the host, the system may read the original LBAs 0-7, replace the older version of LBA 2 with the new version of LBA 2, and rewrite the entire updated set of LBAs 0-7 in a new location (along with a new set of metadata). Besides requiring additional time and power, such write amplification can also reduce the useful life of an SSD if the main memory is limited to an overall number of write operations (e.g., 10,000 writes, etc.).

Accordingly, various embodiments of the present invention are generally directed to metadata management for a data storage array. A multi-tiered metadata scheme is employed that provides two or more tiers of metadata to respectively describe different numbers of blocks of user data. In this way, the appropriate format of metadata is selected for each input group of user data blocks presented for writing to the array.

A metadata logging scheme is employed in at least some embodiments to accumulate recent metadata updates in a separate log structure. The updated metadata are transferred from the log structure to the metadata main store (such as in the storage array) at appropriate times such as when the log has been filled.

These and various other aspects can be understood from a review of the drawings, beginning with FIG. 1 which illustrates an exemplary data storage device 100. For purposes of the present disclosure, the device 100 will be characterized as a solid state drive (SSD) that utilizes NAND flash memory to provide non-volatile storage of user data from a host device.

A programmable controller 101 uses programming in local memory 102 to provide top level control of data transfers with the host through an interface (I/F) 104. The I/F includes requisite data buffering and back end processing to facilitate access of a main memory space 106.

FIG. 2 shows one embodiment of the main memory space of FIG. 1. A flash array 108 is arranged into erasure blocks 110 which are individually erasable prior to allocation. Each block 110 includes a number of pages 112 of fixed size memory. An exemplary block size is 128 pages of 4 KiB (4096 bytes). In some embodiments, each page constitutes a row of flash memory cells coupled to a common word line. Read and write operations take place on a page-by-page basis.

The erasure blocks 110 may be arranged on different chips, dies, layers, etc. Garbage collection units (GCUs) 114 can be formed from a selected number of blocks 110 and allocated and erased as a unit.

FIG. 2 further shows a non-volatile random access memory (NVRAM) 116, and a volatile dynamic random access memory (DRAM) 118. These memories may be incorporated into the flash array 108, or may be located elsewhere within the device 100 such as within the I/F circuit 104 (FIG. 1).

Metadata are used to track the locations of user data stored to the flash array 108. While not limiting, it will be contemplated that the user data are arranged as fixed sized blocks (e.g., 512 bytes) of user data that are uniquely identified by logical block addresses (LBAs). Host read requests will be issued in terms of LBAs (e.g., "read LBAs 100-199"). The system will use the metadata to convert the logical addresses of the LBAs to physical block addresses (PBAs). The physical block addresses may be expressed in terms of a particular GCU, block, page, bit offset, etc. sufficient to identify the physical location of the user data. The system will then retrieve the user data from the identified physical location and transfer the data to the host.

Host write requests will also be issued in terms of LBAs (e.g., "write LBAs 100-199"). The host will supply a write command and the associated user data to be written. The system will write the user data to a suitable location within the flash array 108, such as the next available page(s) in the most recently allocated GCU. Metadata will be generated and stored to describe the location and status of the written data.

A multi-tiered metadata scheme is employed in accordance with various embodiments. A first tier, referred to as an "upper tier," is arranged for groups of N LBAs. The size of N can be chosen as a format option, the workload observed by the device, or derived from other modeling or expertise. A second tier, referred to as a "lower tier," is arranged for a second tier group of M LBAs where M is less than N.

When data are processed with a length less than the first tier grouping size, or if the alignment of the data is not within the first tier mapping, then the system will allocate the write in the next lower tier grouping. This will allocate sub-group writes to a more appropriate size for the incoming command. The smaller grouping size will generally operate to minimize write amplification for the request, and the dynamic allocation will reduce the size for all larger transfers.

In some embodiments, the first tier mapping scheme will provide enough space for all logical groups to be mapped to a physical location, but the sub-groups will not necessarily provide a logical to physical mapping of the entire array. If the available number of sub-groups has been written, then further writes will be carried out at the upper tier. This ratio can be dynamically adjusted to optimize cost (total metadata size) or performance/endurance (less write amplification).

For purposes of the present discussion, N will be set equal to 8 and M will be set equal to 1. Other values and numbers of tiers can be used. It is contemplated that each page 112 (FIG. 2) can nominally store 8 LBAs worth of user data, although such is not required. Compression, encryption, multi-block ECC, and data wrapping techniques are envisioned and can readily be used with the stored user data. The metadata will reside in the flash array 108, such as in specially selected GCUs for that purpose, although other storage arrangements can be made.

A number of metadata structures are formed during the operation of the system. As shown in FIG. 2, a metadata (MD) update log can be maintained in the NVRAM 116 to store metadata updates. Cached portions of the metadata from the flash array 108 can be copied to the DRAM 118. A metadata table can also be maintained in the flash array 108 and copied to the DRAM 118.

FIG. 3 shows an exemplary format for the upper tier metadata. The upper tier metadata are arranged into a number of upper tier groups, with 30 pages in a group to fit evenly within 16 lanes (channels) with redundancy. Each group is arranged as upper tier metadata entries 120 of 36 bits each, with each entry describing up to N=8 LBAs stored elsewhere in the flash array 108. A total of 1024 entries can be stored to a page 112 for a total of about 4 KiB to address each 4 MiB of user data. There will be sufficient entries to map the entire flash array user data memory space. For reference, the entries 120 are also referred to herein as mapping units.

As shown for entry 0, each entry has the following fields to identify various data characteristics: lane 122, die 124, block 126, page 128, span 130, valid 132, submapped 134 and bitmap (BM) offset 136. Depending on the size of the array, the memory space may be located across up to 16 ($2^4$) lanes (channels), 8 ($2^3$) dies/lane and 4,096 ($2^{12}$) blocks/die. The page field identifies the page within the associated block on which the associated LBAs (e.g., LBAs 0-7) are stored. The span bit indicates whether the LBAs span to the following page, and the valid bit indicates whether the data are stale (e.g., a newer version of the data have been written to the array). The submapped bit indicates whether there is at least one lower tier metadata set for the LBAs, and the bitmap offset describes an offset location that will be explained below.

Figure 4:
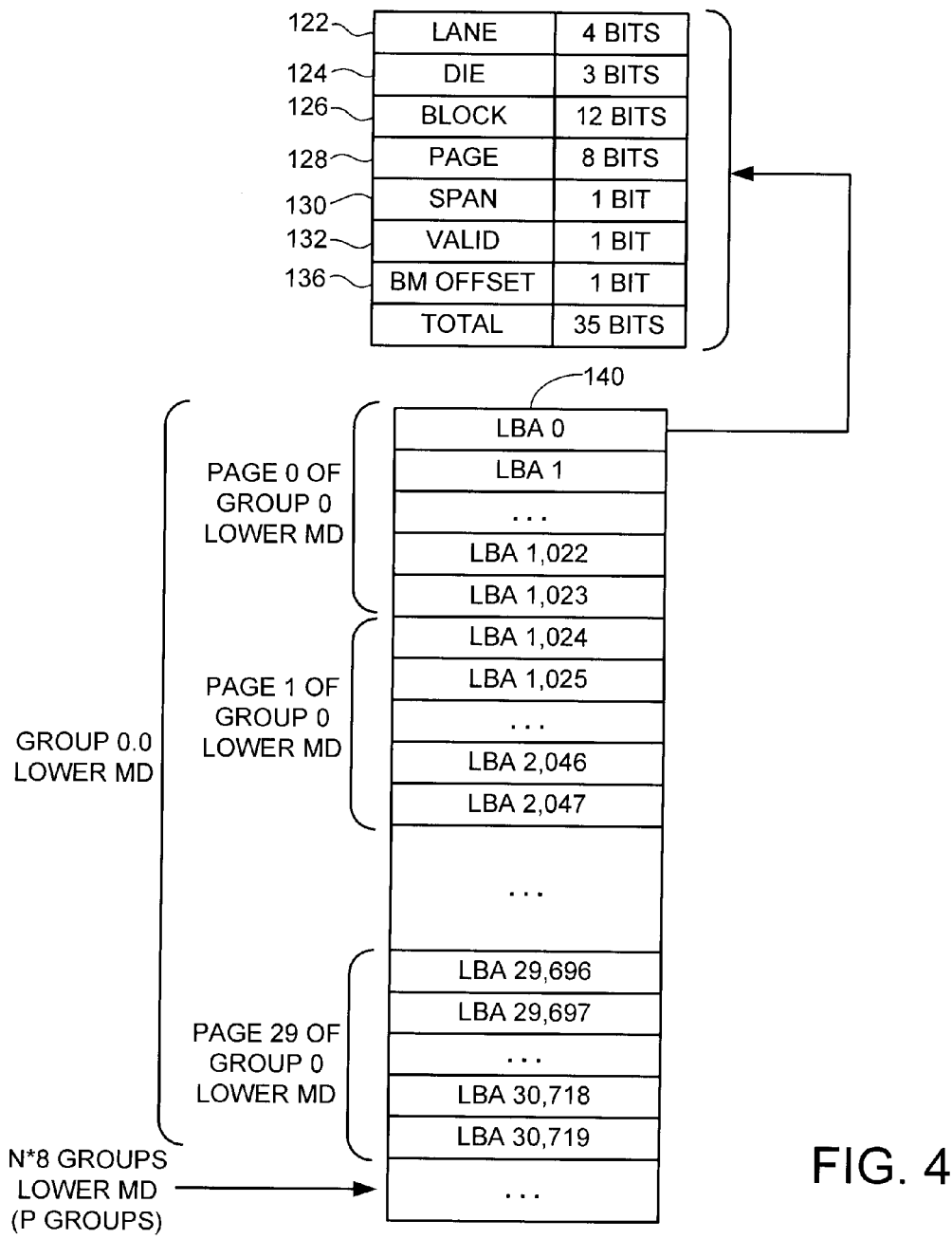
FIG. 4 is an exemplary format for lower tier metadata.

FIG. 4 provides an exemplary format for the lower tier metadata. As with the upper tier metadata, the lower tier metadata are also arranged into a number of lower tier metadata groups with 30 pages in each group. Each lower tier metadata entry 140 is supplied to describe a single LBA, and constitutes 35 bits. Similar fields are provided both the lower and upper tier metadata entries 120, 140, with the exception that the submapped bit 134 are not necessary for the lower tier entries 140 (hence the use of 35 bits instead of 36).

The metadata of FIGS. 3-4 are stored in the flash array 108, such as in special GCUs 114 dedicated to that purpose. ECC codes or other protection can be applied as desired. In some embodiments, a metadata (root) table will map the locations of the metadata groups. The root table can be stored in a deterministic fashion in non-volatile memory, including possible storage in redundant locations to assure access. The root table is loaded to a suitable volatile memory location, such as the DRAM 118 (FIG. 2) or controller memory 102 (FIG. 1) upon power up. The metadata may be stored in sequential upper tier unit order to permit ease of access during metadata lookup operations.

In some embodiments, when an upper tier metadata entry (mapping unit) is written at a lower tier unit level the entire lower tier mapping group for that LBA range will be allocated (e.g., all 30 pages of lower tier metadata). For example, if LBA 0 is written as a lower tier unit, then only the first lower tier group for group 0 (referred to as Lower Tier Group 0.0, or LTG 0.0) will be allocated. However, all 30 pages of LTG 0.0 will be allocated and only the first entry for LBA 0 will be populated with mapping information. The other entries in LTG 0.0 entries will be cleared. If at least one of the LBAs from each lower tier group is written as a lower tier unit, then all 8 of the lower tier groups will be allocated.

Figure 5:
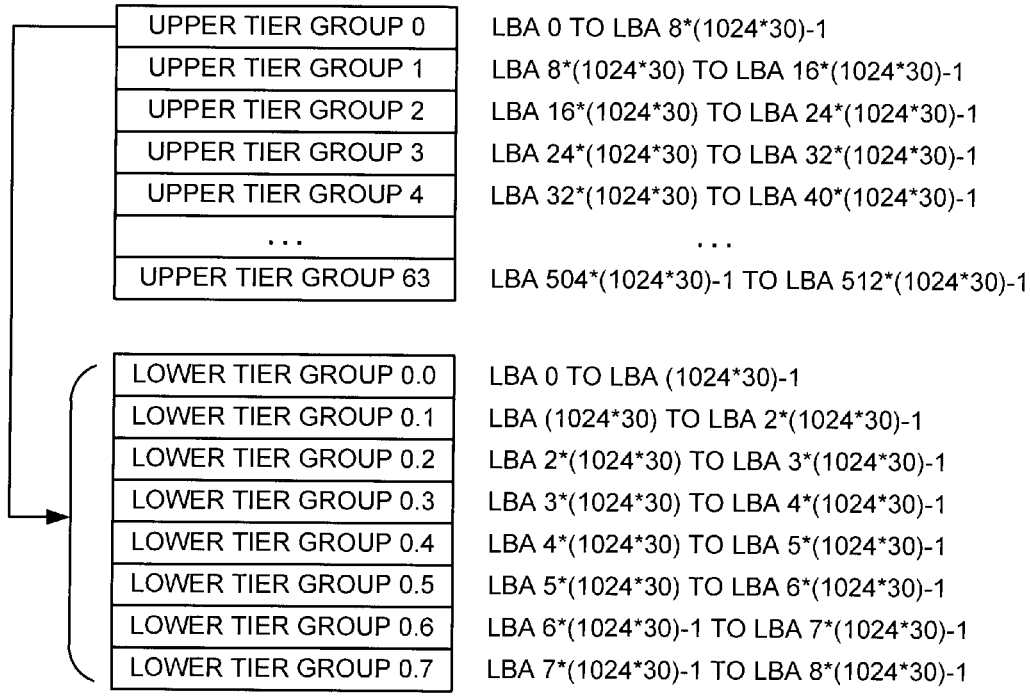
FIG. 5 shows an exemplary layout of upper and lower tier metadata.

This is exemplified by FIG. 5, which shows a lower tier group expansion for UTG 0, along with the associated LBA identifiers. If at least one of the LBAs from each lower tier group is written as a lower tier unit, then all 8 of the lower tier groups can be allocated as illustrated by FIG. 5. When an upper tier mapping unit is defined as a lower tier unit the associated address bits can be used to point to the lower tier mapping unit. Alternatively, a subset of lower-tier pointers can be generated and stored to identify the 8 respective locations. This is because there are only 8 lower tier groups per upper tier group, so there will only be 8 address locations for the LBAs.

In this way, the upper tier address space can be used to store one of the lower tier mapping units in the upper tier location. If only a single LBA of the lower tier unit is written, the lower tier group will not be allocated until a second lower tier unit with the same upper tier group is written. Once the lower tier group is allocated, there would only be a requirement for 7 address locations in the lower tier, and the 8$^{th}$ location would be in the upper tier address location for that group.

An alternative approach is to store other metrics related to the lower tier mapping within the upper tier address space, such as which LBAs are written most frequently, the length of writes in the lower tier, or other useful information which may help form future predictions for whether to allocate the lower tier in the future. For example, one option is to predict that an upper tier group is likely to be read as a complete upper tier mapping unit (8 LBAs) in the future, so it would be beneficial to allocate the lower tier for that group.

The above scheme contemplates total metadata requirements of about 9 GiB for a user data capacity of 1 TiB, which is an overhead requirement on the order of about 1%. Nevertheless, it will be appreciated that providing the NVRAM 116 (FIG. 2) with a storage capacity sufficient to store all of the metadata (9+GiB) may be cost prohibitive.

Accordingly, in some embodiments the metadata are stored in the flash memory 108 for non-volatile retention, and portions of the metadata are copied as required to the DRAM 118 (or other local volatile memory) to service on-going requests. In this scheme, the NVRAM 116 is used to maintain a metadata log structure where metadata updates, or new metadata entries, are stored for the most recent data activity.

This allows the use of a substantially smaller NVRAM size. While design requirements may vary, a suitable log (NVRAM) size may be on the order of about 1/30 of the total metadata size. The log is used to accumulate metadata changes during operation. Once the log is filled, the metadata updates are written to the metadata array.

Figure 6:
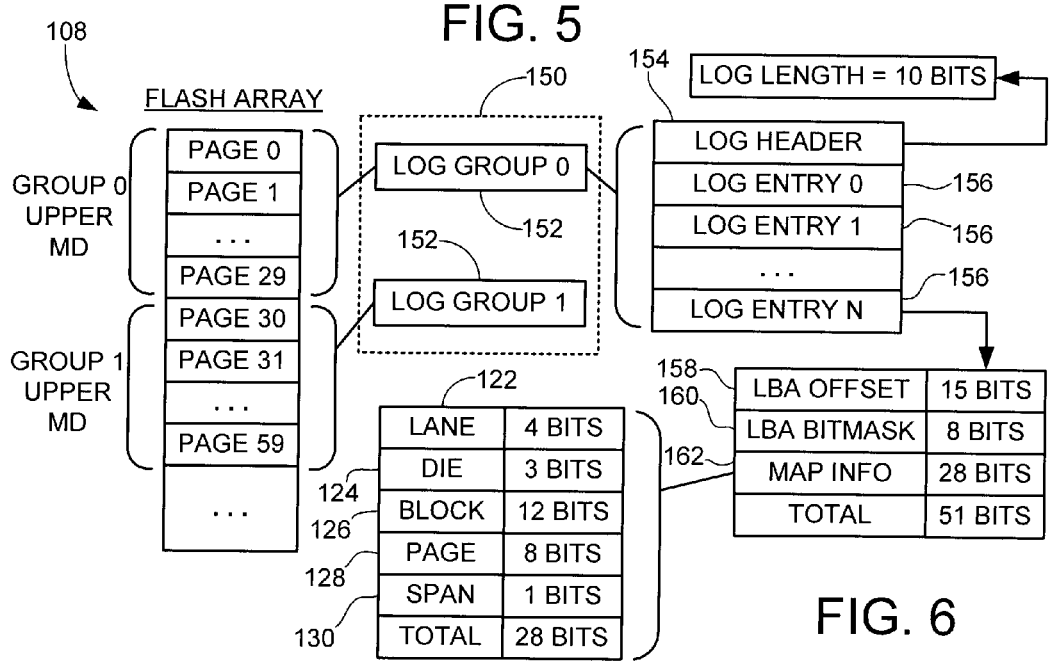
FIG. 6 illustrates a format for a metadata log structure.

FIG. 6 shows an exemplary format for a metadata log 150 maintained in the NVRAM 116 (FIG. 2). The log 150 is formed of log groups 152, with one log group for each group of upper tier metadata (MD). An exemplary format for each of the log groups 152 is shown for log group 0. A log header 154 identifies the log group and has a length of 10 bits. Log entries 156 are each 51 bits in length. Log entry fields include LBA offset 158 (15 bits), LBA bitmask (8 bits) and map information (28 bits). Other formats can readily be used.

In the example of FIG. 6, the primary map unit size is 30 bits to uniquely describe the physical location of every logical unit. The primary metadata can facilitate a table look-up operation based off the logical offset into the table. Each log entry may be larger than the standard upper and lower metadata entries to include additional information in order to identify which LBAs are being logged in the entry.

By way of illustration, for a 1 TiB physical capacity of the flash memory (to accommodate 800 GiB of user data sectors), there may be about 190,735 metadata pages, 6,358 log groups and 50 GCUs. Each log would be sized to a page (4 KiB), resulting in about 25 MiB of NVRAM for the log updates. There may be about 700 entries of metadata in each log group 152.

Assuming a workload of substantially random 4 KiB writes to the flash array 108, there may tend to be about 2.8 MiB (4 KiB per entry*700 entries) of host data received before the log would be filled. This would correspond to about 120 KiB (30 pages per group*4 KiB per page) of metadata that needs to be written once the log (journal) is filled.

Wear amplification, which can be expressed as a ratio of total physical writes to satisfy each host write command, can be calculated by taking the total data written to the NVRAM (2.8 MiB+120 KiB) and divide the total data written by the host (2.8 MiB). This results in a wear amplification value of about 1.05. This is in contrast to not storing the updates in a log structure, which would reduce processing overhead but may result in a higher write amplification value of about 2 NVRAM writes for every host write given the same random 4 KiB workload. To maintain the metadata in an accurate condition, all metadata should be written to the non-volatile NVRAM before being transferred to the non-volatile flash array 108.

Metadata log writes can be carried out in a variety of ways. In some embodiments, new user data received from the host may be buffered prior to being written to the flash array 108, such as in a buffer memory of the I/F 104 (FIG. 1). Writeback caching may be employed so that a report is made to the host that the data write operation has been completed, even though the write operation will be scheduled at a later time. This allows higher throughput rates as higher priority access operations, such as read operations, can be serviced in the interim. Steps may be taken to ensure that the cached writeback data are stored in non-volatile memory, or transferred from volatile memory to non-volatile memory upon detection of a power down condition.

When the cached user data are scheduled for writing to the flash array 108, the data may be written to the next available page (112, FIG. 2) in the most recently allocated GCU 114 (FIG. 2). A corresponding metadata entry will be generated and stored in the log 150 (FIG. 6) in the NVRAM 116 (FIG. 2). If the write data are arranged as a set of modulo-N LBAs, upper tier metadata will be used to describe each set of N (8) LBAs. If the write data are non-aligned or constitute a smaller set of LBAs, lower tier metadata entries may be selected to describe these smaller write units. Since the flash array 108 may be arranged to write a full page's worth of data, multiple groups of the smaller write units may be assembled to fit on a single page.

As mentioned above, a cached metadata table may be maintained to show where all existing metadata is located to facilitate searching for the associated metadata for a selected operation. In some embodiments, this metadata table may also be updated at this time to reflect the existence of the new entries added to the metadata log in NVRAM.

Alternatively, it may be more efficient to not update the metadata table at this time, and instead provide a search methodology that consults the metadata log prior to consulting the metadata table. This will be discussed in detail below.

FIG. 7 provides an exemplary sequence of metadata logging updates. An initial state (1) begins with an empty log. That is, there are no entries for log groups 0-N at this point. Upon the receipt of a number of write commands, successive updates to the log 150 are provided as shown by exemplary states (2)-(4). Any number of suitable ways can be used to populate the log. In some embodiments, the appropriate log group (in this case, log group 0) can be identified by the calculation LBA[31:18]. The lowest three bits of the LBA field can be ignored because there will be an entry on an upper tier mapping unit (8 LBAs). Also, 32 metadata pages can be ignored since these are logged within a single log group. Each metadata page holds 1024 entries, so the next 15 bits can also be ignored (32*1024).

When an entry is entered into the log, an LBA Offset can be calculated from LBA[17:3]. The lowest 3 bits of the LBA field are ignored for the reason set forth above. A total of 15 bits can be used to address the 32K unique possibilities. An LBA bitmask value will be set based on which of the 8 LBAs within the upper tier mapping unit were written within the same compressed unit.

As shown in FIG. 7, a first entry is provided at state (2) to log group 0 to provide metadata corresponding to the writing of three LBAs (length=3) with beginning LBA address 0x1 to page at address X. For log group 0, the log header 154 is incremented to 1 to indicate 1 entry, and the log entry field 156 is populated with the bits necessary to describe the write event. Similar updates are provided at states (3) and (4). The header field 154 is updated at state (4) to reflect the presence of two entries for log group 0. Entries continue to be added to the log until the log is filled. The rate at which the log is filled will depend on the rate at which new writes are provided by the host.

Figure 8:
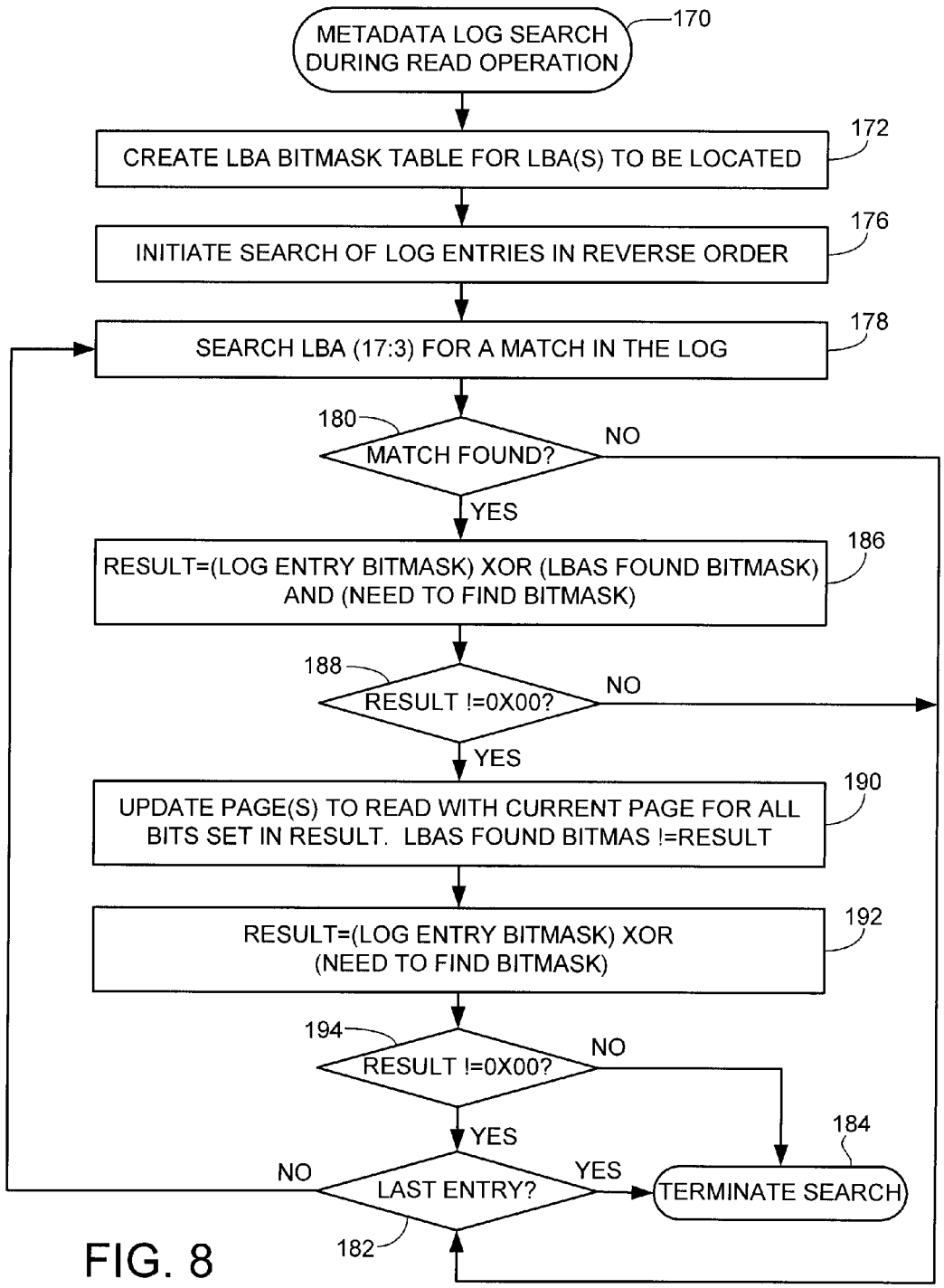
FIG. 8 provides an exemplary metadata log search routine.

FIG. 8 provides a flow chart for an exemplary METADATA LOG SEARCH routine 170 illustrative of steps carried out in accordance with some embodiments to search the log structure of FIGS. 6-7. It is contemplated that the routine 170 will be carried out during a read operation in which the host has requested retrieval of certain LBAs worth of data. In some embodiments, a system controller such as 101 in FIG. 1 has associated programming and available memory space to carry out the routine.

The routine 170 facilitates an efficient determination of whether the requested data have a metadata entry in the log, and if so, where the data are resident in the flash array. Other read sequences that search metadata stored elsewhere in the system will be described below. It will be appreciated that the routine 170 is merely exemplary, as any number of formats and search methodologies will occur to the skilled artisan in view of the present disclosure.

Figure 9:
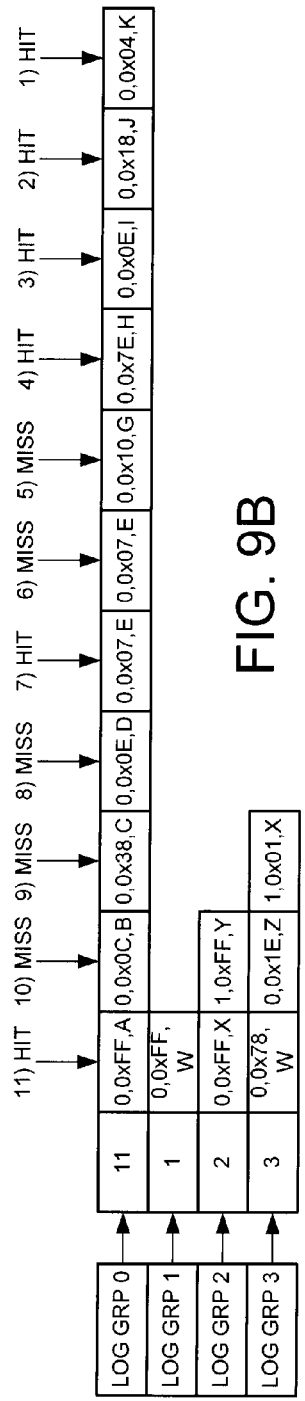
FIGS. 9A-9C illustrate the generation and use of a bitmask during the routine of FIG. 8.

At step 172, an LBA bitmask table is initially generated for the LBA(s) to be located during the search. FIG. 9A shows an exemplary bitmask table 174 generated by step 172 in FIG. 8. In this example, the LBAs to be found are identified as LBAs 0-7, which are listed in reverse order in a first row of the bitmask table. A second row of the bitmask table 174 provides "need to find" bits, which are all set to an initial value (e.g., logical 1). A third row of the bitmask table 174 provides "LBAs found" bits, which are all set to a different initial value (e.g., logical 0). These respective values may be individually incremented as the LBAs are located within the log. A fourth row of the bitmask 174 is left intentionally blank, and is used to store address indicators for the "page(s) to be read" in order to retrieve the associated LBAs. It will be appreciated that the page addressing may include higher level address information as well (e.g., lane, die, GCU, etc.) needed to locate the target data in the flash array, but these aspects are omitted for clarity.

Returning to the routine of FIG. 8, at step 176 a search is initiated of log entries in the log 150 in reverse order beginning with a first selected LBA from the bitmask table 174 (step 178). The search can ignore the last 3 bits of the LBA address because a log entry will not span an upper tier mapping unit, as discussed above. There may be multiple entries for a given LBA within a log group, so the most recent entry will constitute the most current data for the LBA. A sequence of searches with associated hits and misses is illustrated by FIG. 9B.

If a match is not found during this search of the log (decision step 180), then it will be necessary to search elsewhere in the system to locate the page address for the associated LBA. At this LBA, the missing LBA will be skipped ("need to find" value in the bitmask 174 remains set to logical 1 and "LBAS found" value remains set to logical "0"). Decision step 182 determines if there are additional LBAs in the bitmask to be searched. If so, the next LBA in the bitmask table 174 is selected and a search is carried out therefor; if not, the routine terminates at 184.

If a match is found for a given LBA, the flow passes from step 180 to step 186 where a result value is generated. If the result is not 0x00 (step 188), the next entry is selected, otherwise, the page to read value is updated with the current page for all bits set by the result value (step 190). Result is set to the exclusive or (XOR) combination of the log entry bitmask and need to find bitmask bits at step 192. If Result is 0x00 (step 194), that is, both bit are set to logical 1 as in FIG. 9C, the most current version of the LBA has been found and the page to read value indicates the page address where the data are located.

FIG. 9C illustrates the bitmask of FIG. 9A in a populated state at the conclusion of the search routine of FIG. 8. The bitmask in FIG. 9C is numerically designated 174A and indicates that log entries have been successfully identified in the log structure 150 for all of the requested LBAs. The "LBAS found" bits are all set to logical 1, and the addresses of the pages to be read (represented by alphabetic letters) are accumulated in the bitmask table. The LBA search routine should ensure that only unique pages to be read are returned for specific LBAs. This is accomplished as set forth above by comparing the LBAs found bits with the need to find bits. If there are no new LBAs within that log entry, a miss will be declared.

Figure 10:
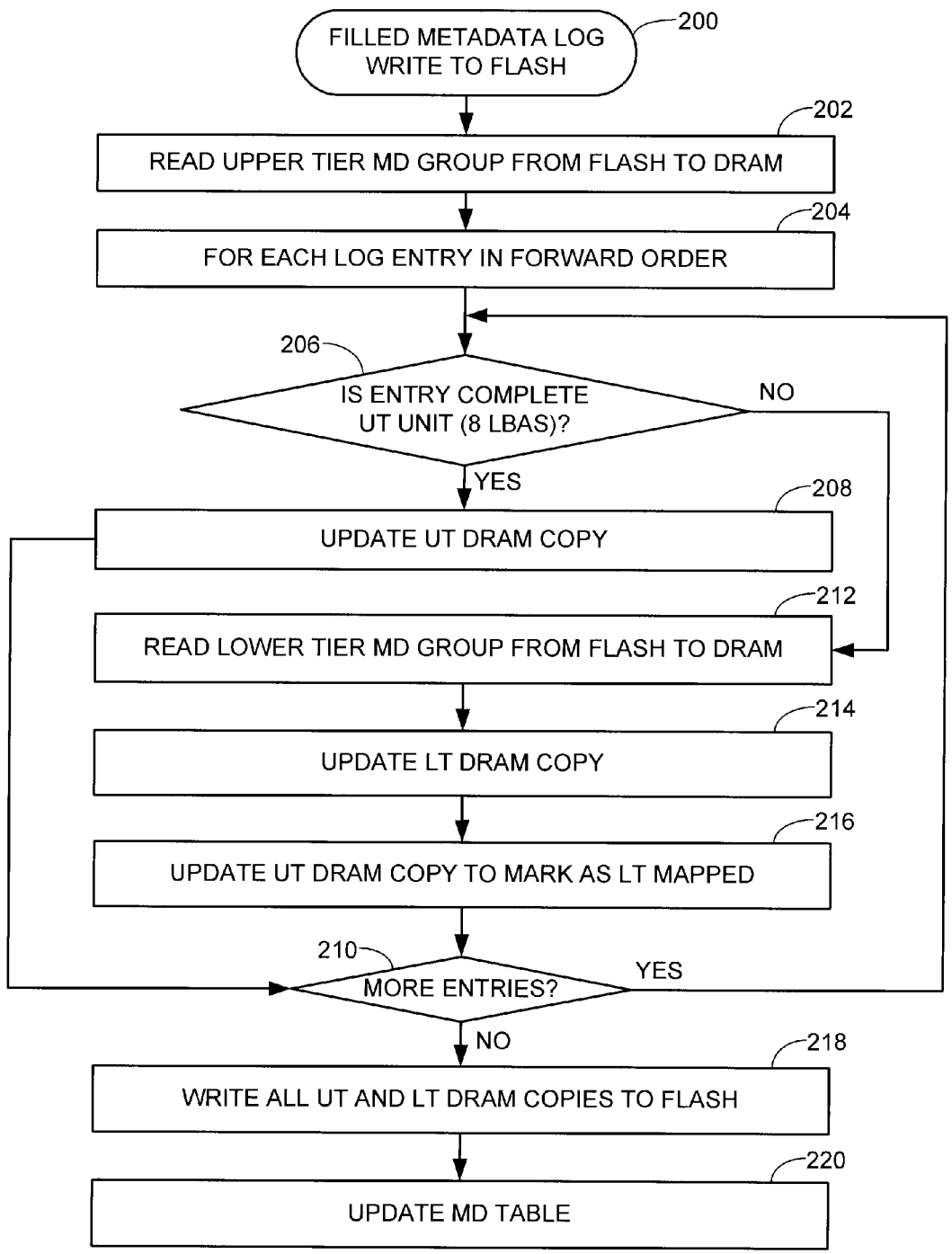
FIG. 10 provides an exemplary metadata log write routine.

FIG. 10 illustrates a FILLED METADATA LOG WRITE TO FLASH routine 200. This routine is utilized at appropriate times with the log has been filled, or at other suitable times during the operation of the device. For example but not by limitation, if the log has been substantially filled and the device enters an idle or low activity period, the device may take advantage of the lull and elect to proceed with the routine 200 in preparation for an anticipated upcoming high I/O period of operation.

The routine 200 generally operates to synchronize (sync) the metadata updates in the log to the metadata stored in flash, and to append the metadata table to reflect these updates. For each log entry, the routine generally operates to update the upper tier group associated with the entry, and/or any lower tier subgroups which were updated by the entry. In this way, if there is a localized access to a lower tier group, only the affected lower tier group(s) may be modified.

If new write commands are received during the metadata sync operation of FIG. 10, it may be desirable for the system to cache the data in separate memory until the routine has been completed, and then accumulate new log entries in the "emptied" log as the writeback data are subsequently written to the flash array.

Beginning at step 202 in FIG. 10, the associated upper tier metadata group for the log entries is temporarily copied from the flash array 108 to DRAM 118 or other local memory for access during the routine. This upper tier MD may be identified using the metadata table. Step 204 shows that each log entry in the log structure 150 is processed in turn in forward order (e.g., from oldest to youngest in each log group).

A first determination made at step 206 is whether the entry describes a complete upper tier unit (e.g., a full set of aligned 8 LBAs). If so, the upper tier metadata in the DRAM memory is updated with this new information to reflect the new location of the data, as shown by step 208. The flow the passes to decision step 210 which determines whether there are more entries in the log that require processing. If so, the routine passes back to step 206 for evaluation of the next entry.

If the log entry describes lower tier data, the flow passes from step 206 to step 212 where the associated lower tier metadata group is copied from the flash array to the DRAM memory. The lower tier MD in the DRAM is updated by the data from the log entry at step 214, and the associated upper tier MD in the DRAM is updated to mark the presence of the new associated lower tier entry at step 216. For example, the submapped bit (field 134, FIG. 3) can be set to 1 for the upper tier entry during step 216.

The foregoing steps continue until all of the log entries have been processed and the associated upper and lower tier MD have been cached and updated. The flow continues to step 218 where the upper and lower tier MD in the DRAM are written to the flash memory. The metadata table is updated at step 220 to reflect the updated locations of the metadata in the system. The MD table may be stored in redundant locations in the flash memory 108 and a copy maintained in the DRAM for ease of reference.

It will be recalled that the metadata are used to track the locations of user data stored in the flash memory by the host. During a host read operation in which the host requests retrieval of selected LBAs of user data, the system will use a hierarchical approach to quickly locate and retrieve the most current version of the requested data.

Figure 11:
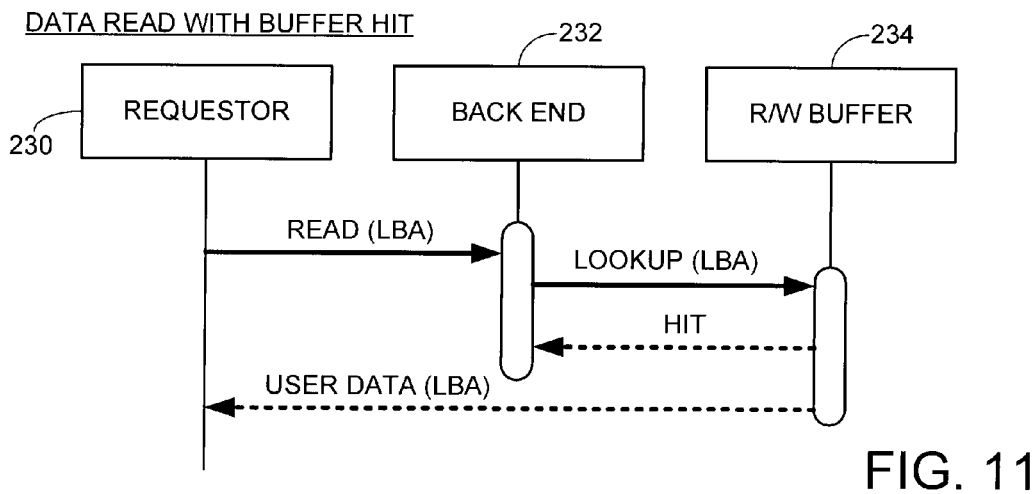
FIGS. 11-15 provide respective timing and sequence diagrams during read operations for user data described using the exemplary upper and lower metadata of FIGS. 3-4.

FIG. 11 shows an exemplary read sequence for a first case in which the requested data reside in local buffer memory (resulting in a "cache hit"). Three functional blocks (circuits) are represented in FIG. 11; a requestor 230, a back end 232 and a R/W buffer 234. The requestor 230 operates as a scheduler to queue and issue commands received from the host. The back end 232 operates as a sequencer to direct downstream processing. The R/W buffer 234 may constitute a large local volatile or non-volatile memory space in the I/F 104 (FIG. 1) used to store data pending transfer to or from the host. It will be appreciated that the various sequences may be enacted by the controller 102 or other control circuitry of the device 100.

FIG. 11 represents a timing and sequence diagram to show data commands and data transfers between the various circuits in order. Transfers lower down on the page occur later in time than transfers higher up on the page. Upon receipt of a read command for a selected LBA, the requestor 230 directs the back end 232 to perform a lookup search for the user data in the local buffer 234. If a cache hit is reported, the data are returned from the buffer 234 to the requestor 230 for transfer to the host. It will be appreciated that cache hits are desirable since the host read commands can be immediately serviced from the local buffer without further processing by the device.

Figure 12:
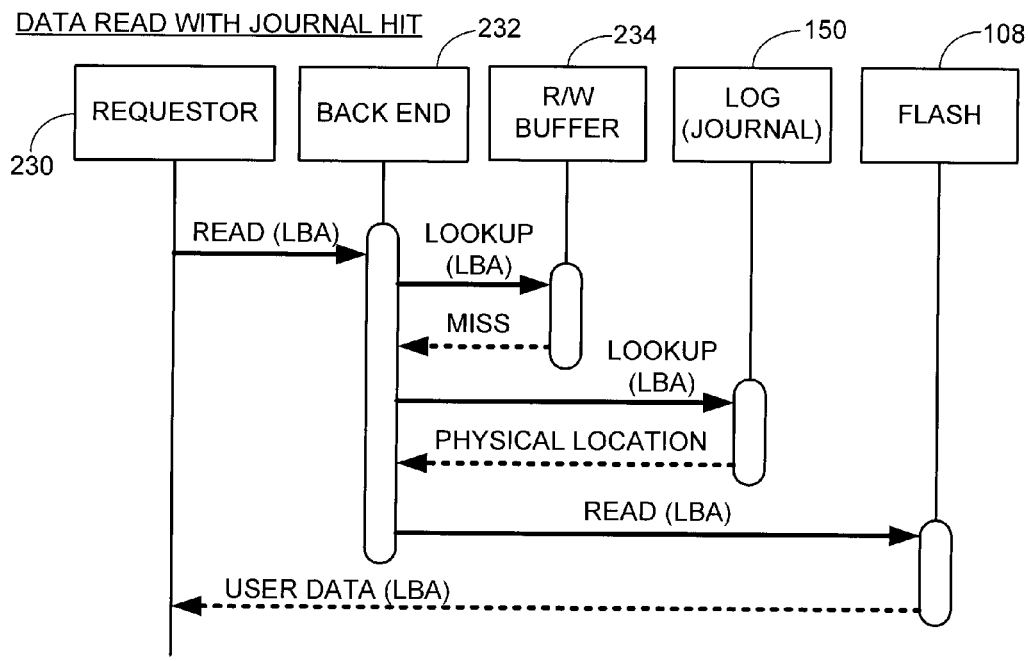

FIG. 12 provides a timing and sequence diagram for a case in which log entries exist in the log 150 for the requested data. That is, the data being requested by the host have been recently written by the device, and metadata updates for the data remain present in the log.

As before, the back end 232 initially checks the local R/W buffer 234 to see if the requested user data are cached locally. Since they are not, the back end 232 initiates a search of the log (journal) 150 to determine whether an updated log entry exists for the requested data. This search may take place as set forth by the routine 170 in FIG. 8.

When the data are determined to have log updates, a bitmask will be generated such as described in FIGS. 9A-9C that reports the physical locations (e.g., page addresses) for the requested data. These physical locations are reported to the back end 232, which schedules a read operation with the flash array 108. The requested data are read out on a page-by-page basis from the indicated locations in the flash array and returned to the host.

Figure 13:
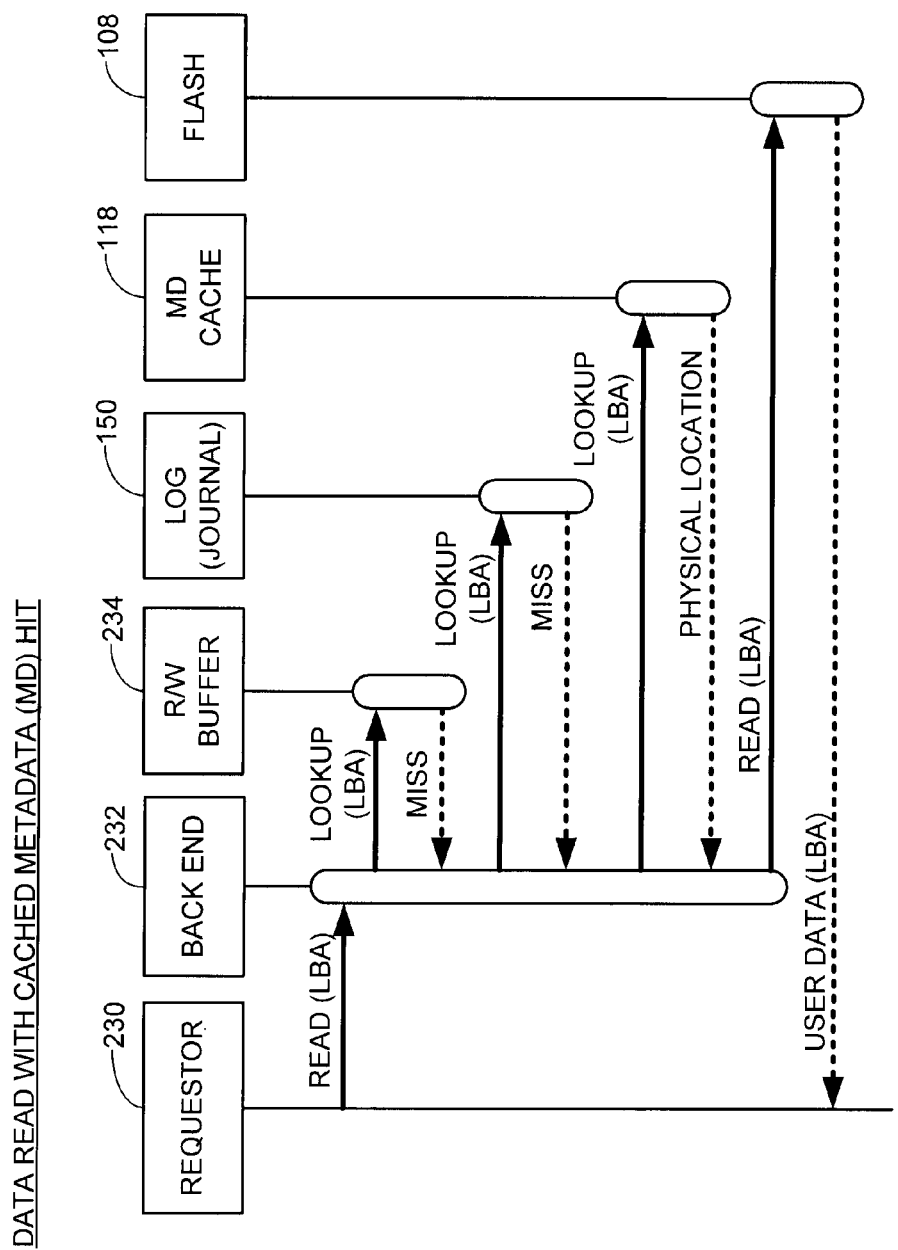

FIG. 13 provides a timing and sequence diagram for a case where the requested user data LBAs do not have updated log entries in the log 150. As before, the back end 232 schedules searches of the local buffer 232 and the log 150, but these result in complete (or partial) misses. The back end 232 next determines whether the metadata for the requested data are present in the local cache (DRAM 118). This can be carried out by a simple lookup operation upon the cached MD in view of the MD formats of FIGS. 3-4. If the MD for the requested data are present in the cache, the physical locations (such as page addresses) for the requested data are returned and the back end 232 schedules a read operation upon the flash memory 108 to return the requested data to the host.

Figure 14:
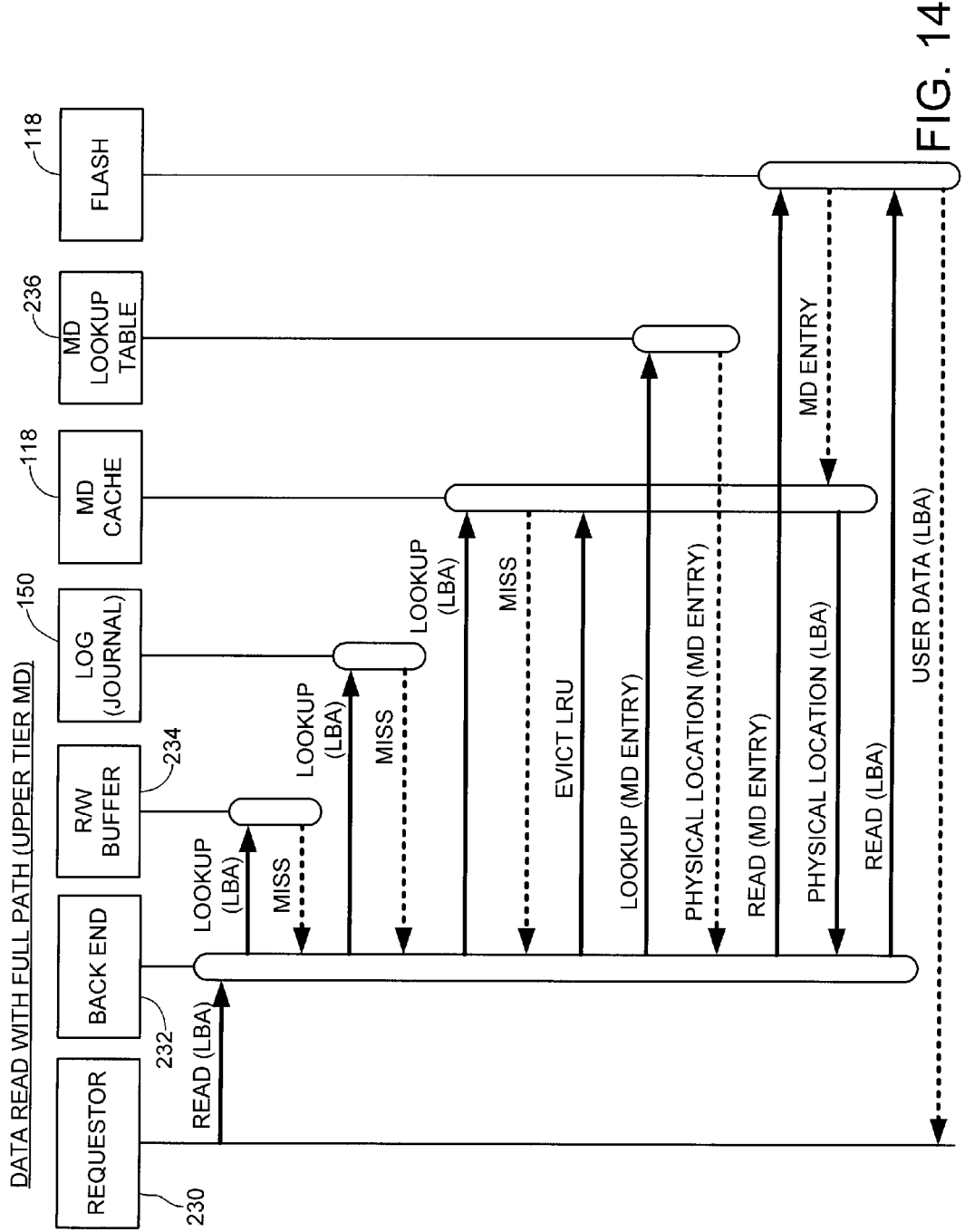

FIG. 14 provides another timing and sequence diagram for a case in which the foregoing operations fail to identify the location of the requested data. Because in this situation the DRAM 118 does not store cached MD for the requested user data, the back end 232 identifies the least recently used (LRU) metadata for eviction from the cache. The back end 232 for the first time consults the metadata table (numerically denoted at 236) and executes a read operation upon the flash memory 108 to copy the associated metadata to the cache. This updated cached MD overwrites the evicted LRU metadata.

The physical location of the user data is next obtained from the newly cached metadata, and the flash memory is read to return the requested user data to the host. It will be appreciated that the requested user data in FIG. 14 are described by upper tier metadata; that is, the read request was for 8 LBAs (or modulo 8 LBAs) written as one or more upper tier units to one or more selected pages.

Figure 15:
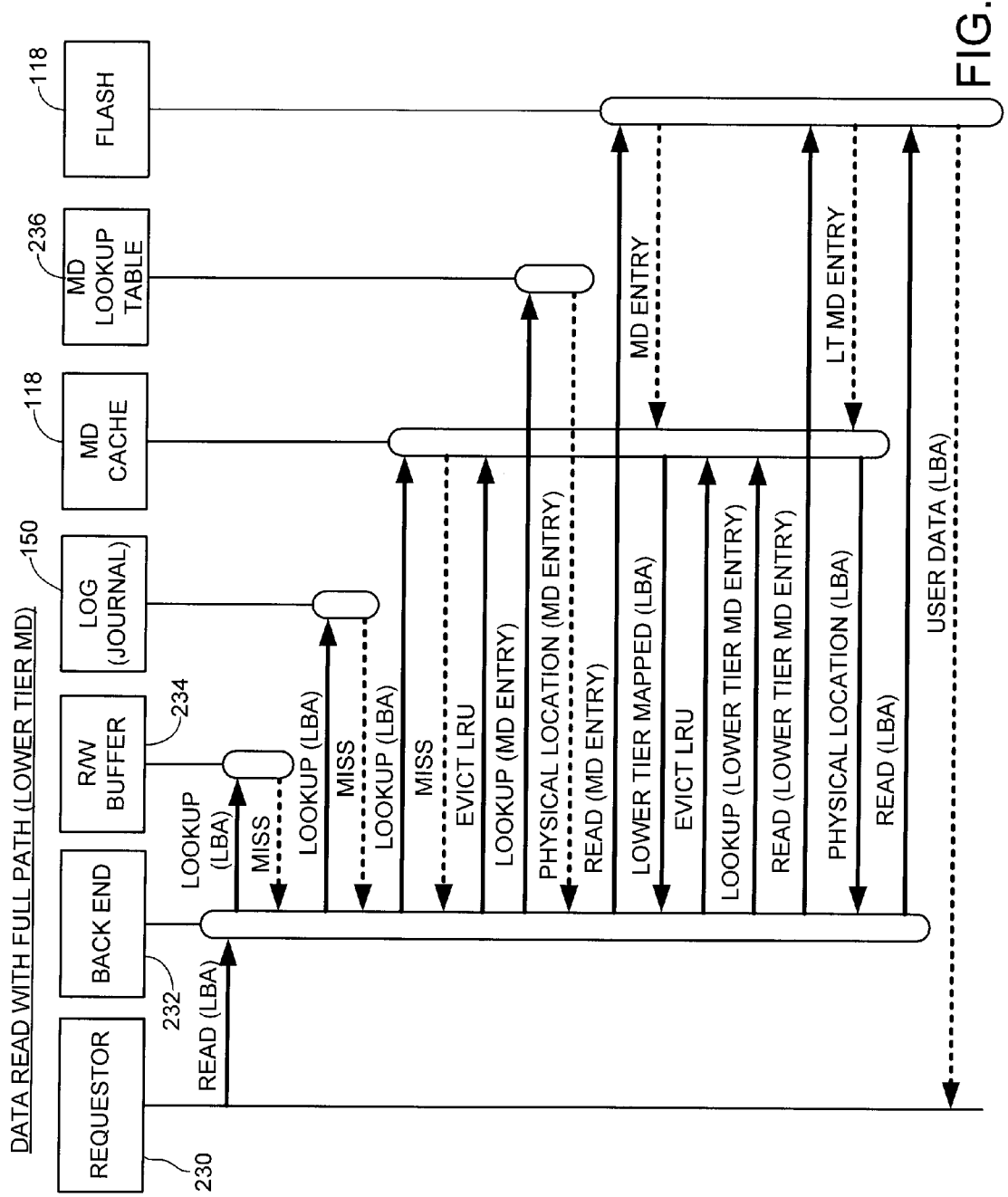

Finally, FIG. 15 provides a timing and sequence diagram for a worst case scenario in which the requested data are described by one or more sets of lower tier metadata, and thus, may be stored on different pages or even in different GCUs. The flow of FIG. 15 is similar to that of FIG. 14, except that upon reading the newly cached upper tier metadata, the submapped value directs the back end 232 to perform a second consultation of the metadata table, and a retrieval of the lower tier metadata from flash to cache. The physical location(s) of the requested LBAs are obtained from the lower tier metadata, and the data are retrieved from the flash array from said location(s).

It will be noted that the retrieval of FIG. 15 may involve the retrieval of some LBAs described by the upper tier metadata and some LBAs described by the lower tier metadata. For example, referring again to the previous example given at the beginning of the present discussion, consider the situation where the host has written LBAs 0-7, and then provided an update for LBA 2. As discussed above, an upper tier MD entry will be generated and stored (first in the log, eventually in the flash) for the initial LBAs 0-7. A lower tier MD entry will be subsequently generated and stored (first in the log, eventually in the flash) for the updated LBA 2.

Responsive to a subsequent read operation for LBAs 0-7, the system will follow the sequence of FIG. 15. The upper tier metadata will be used to recover the first set of LBAs 0-7. The lower tier metadata will be used to recover the newer version of LBA 2. The back end 232 will operate to replace the old LBA 2 with the newer version of LBA 2, and then transfer the requested LBAs 0-7 to the host.

Figure 16:
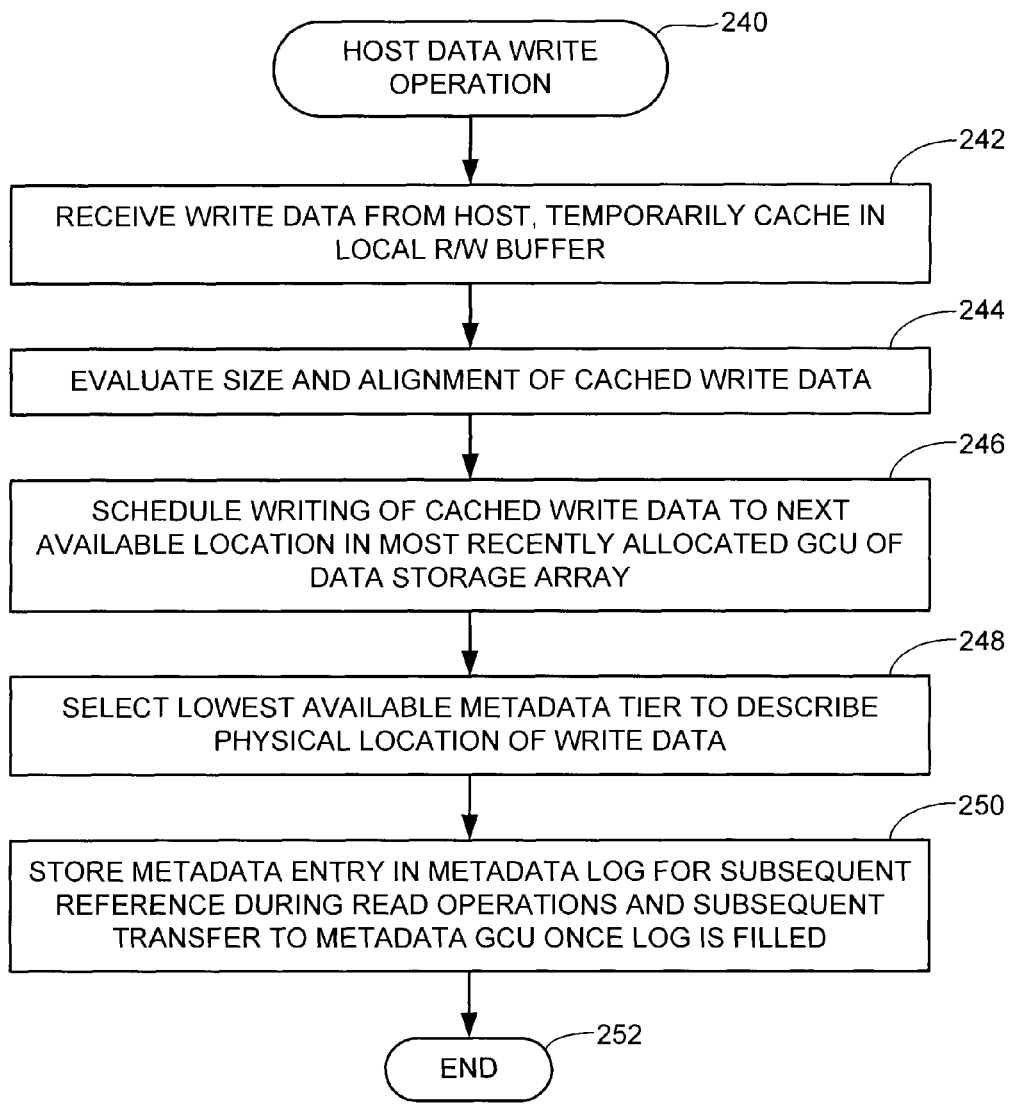
FIG. 16 is a flow chart for an exemplary user data write routine.

FIG. 16 provides a HOST DATA WRITE OPERATION routine 240 to summarize steps carried out in accordance with the foregoing discussion to satisfy host write requests in a data storage device such as 100 in FIG. 1. As shown by step 242, when data are received from the host to be written to memory, the data are temporarily cached as writeback data such as in R/W buffer 234.

At step 244, the cached writeback data are evaluated to identify the lowest available metadata tier that can be used to describe the storage location of the data. For example, if L blocks of cached writeback data can be arranged into one or more groups of N data blocks (e.g., N=8), then the upper tier metadata scheme will be employed for each group of N data blocks. Contrawise, if L is less than N or the cached writeback data blocks do not align with modulo-N boundaries, the lower tier metadata scheme can be employed for each group of M data blocks (e.g., M=1).

If L is greater than N but not divisible by N, such as in the case of LBAs 0-10, in some embodiments the system may elect to use an upper tier metadata entry to describe the storage of LBAs 0-7, and one or more lower entries to describe the remaining LBAs 8-10. Similarly, if L is greater than N but non-aligned with an N*X boundary (where X is an integer), such as LBAs 14-23, the system may elect to use a lower tier metadata entry to describe LBA 14, and then an upper tier metadata entry to describe the remaining eight LBAs 15-23.

The cached writeback data are scheduled for writing at step 246. In at least some embodiments, the data are written to the next available page 112 in the most recently allocated GCU 114 (see FIG. 2) in a non-volatile data storage array (such as the flash array 108).

Associated metadata at the appropriate tier level are generated at step 248. While not required, in at least some embodiments the generated metadata are accumulated in a log structure such as 150 so as to be readily available during subsequent read operations. The accumulated log entries are transferred to the memory array when the log is filled. A metadata table can also be updated as desired upon the transfer of the metadata updates. The routine then ends at 250.

It will be appreciated that the various embodiments discussed herein have numerous potential applications and are not limited to a certain field of electronic media or type of data storage device. The use of multiple tiers of metadata can be beneficial in some applications to reduce the total amount of overhead, increase data capacity and reduce write amplification rates. The logging of metadata updates as set forth by some embodiments can also reduce write amplification rates and may result in faster data I/O rates if requests are made for recently written data.

For purposes herein, the references to rows and columns will be read broadly as relational identifiers in an ordered array of elements along different axes without constituting a specific physical layout. Thus for example, the term "row" may constitute a physical column without deterring from the spirit of the present invention.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   using a multi-tiered metadata scheme to generate metadata which describes a selected physical address at which a group of user data blocks is stored in a data storage array, said scheme providing an upper tier metadata format adapted for groups of N user data blocks and a lower tier metadata format adapted for groups of M user data blocks where M and N are numbers and M is less than N; and
   storing the generated metadata in a memory in accordance with a selected one of the upper or lower tier metadata formats in relation to a total number of the user data blocks in said group.

2. The method of claim 1, further comprising using the upper tier metadata format to describe the selected physical address when a total number of the user data blocks L is equal to N, and using the lower tier metadata format to describe the selected physical address when L is less than N.

3. The method of claim 1, further comprising using the upper tier metadata format to describe the selected physical address when a logical address of the user data blocks aligns with an N*X boundary where X is an integer, and using the lower tier metadata format to describe the selected physical address when the logical address does not align with said boundary.

4. The method of claim 1, in which the memory comprises a log structure in non-volatile memory which accumulates metadata entries associated with recent write operations to the data storage array, the method further comprising transferring the accumulated metadata entries from the log structure to the data storage array when an amount of metadata entries in the log structure reaches a predetermined level.

5. The method of claim 1, in which the group of user data blocks comprises a first set of N user data blocks having a first logical block address (LBA) and written to a first physical address of the data storage array responsive to a first host write command and described by metadata arranged in accordance with the upper tier metadata format.

6. The method of claim 5, further comprising subsequently writing a second set of M user data blocks to a second physical address of the data storage array responsive to a second host write command and described by metadata arranged in accordance with the lower tier metadata format, wherein the M user data blocks have said logical block address of the first set of N user data blocks and constitute an updated version of a portion of said first set of N user data blocks.

7. The method of claim 1, further comprising processing a host read operation to retrieve the group of user data blocks to a host by:
   accessing the generated metadata in the memory;
   identifying the selected physical location in the data storage array from the located metadata; and
   scheduling a read operation upon the data storage array to retrieve the group of user data blocks to the host.

8. The method of claim 1, further comprising:
   transferring the generated metadata from the memory to a second physical address of the data storage array; and
   updating a metadata table which identifies the generated metadata as being stored at the second physical address of the data storage array while processing a host read operation to retrieve the group of user data blocks to a host.

9. The method of claim 8, in which the processing step comprises:
- determining that the generated metadata are not present in the memory;
- consulting the metadata table to identify the second physical address of the data storage array;
- scheduling a first read operation upon the data storage array to retrieve the generated metadata from the second physical address to a local memory;
- identifying the selected physical location in the data storage array from the located metadata in the local memory; and
- scheduling a second read operation upon the data storage array to retrieve the group of user data blocks to the host.

10. The method of claim 1, in which N is set equal to 8 and M is set equal to 1.

11. The method of claim 1, in which the data storage array is a flash memory array arranged into rows and columns of flash memory cells, each row constituting a page of memory adapted to store N user data blocks.

12. The method of claim 1, in which a metadata entry formatted in accordance with the upper tier metadata format occupies a first total number of bits, and a metadata entry formatted in accordance with the lower tier metadata format occupies a different, second total number of bits.

13. A method comprising:
- providing a multi-tiered metadata scheme to describe physical addresses at which groups of user data blocks are stored in a data storage array, said scheme providing a upper tier metadata format adapted for groups of N user data blocks and a lower tier metadata format adapted for groups of M user data blocks where M and N are numbers and M is less than N; and
- storing metadata in a memory responsive to a host write request to write a group of a number L user data blocks to the data storage array, the metadata formatted in accordance with the upper tier metadata format if L is equal to N, and in accordance with the lower tier metadata format if L is less than N.

14. The method of claim 13, in which the memory comprises a log structure in non-volatile memory which accumulates metadata entries associated with recent write operations to the data storage array, the method further comprising transferring the accumulated metadata entries from the log structure to the data storage array when an amount of metadata entries in the log structure reaches a predetermined level.

15. The method of claim 13, in which a first metadata entry is stored in the data storage array to describe a first set of user data blocks, and a second metadata entry is stored in the data storage array to describe a second set of user data blocks which are updated versions of a portion of the first set of user data blocks.

16. An apparatus comprising:
- a data storage array of non-volatile memory cells;
- a local memory; and
- a controller adapted to direct a write operation upon the data storage array to store a group of user data blocks to a selected physical address of the array, and to generate metadata to describe the selected physical address in accordance with a multi-tiered metadata scheme which provides an upper tier metadata format adapted for groups of N user data blocks and a lower tier metadata format adapted for groups of M user data blocks where M and N are numbers and M is less than N, the controller further adapted to store the generated metadata in the memory in accordance with a selected one of the upper or lower tier metadata formats in relation to a size of the group of user data blocks.

17. The apparatus of claim 16, in which the controller is adapted to generate the metadata as an upper tier metadata entry when a total number of the user data blocks in said group is equal to N, and to generate the metadata as a lower tier metadata entry when the total number of the user data blocks in said group is less than N.

18. The apparatus of claim 16, in which the controller accumulates metadata entries in a log structure in the memory and transfers said metadata entries from the log structure to the data storage array when a total number of said entries reaches a predetermined value.

19. The apparatus of claim 16, in which the data storage array is a flash memory array arranged into rows and columns of flash memory cells, each row constituting a page of memory adapted to store N user data blocks.

20. The apparatus of claim 16, in which the metadata comprises an upper tier metadata entry generated in accordance with the upper tier metadata format and includes at least one bit value that indicates the existence of a corresponding lower tier metadata entry in memory.

* * * * *